(12) United States Patent
Yoshida

(10) Patent No.: US 10,884,305 B2
(45) Date of Patent: Jan. 5, 2021

(54) LIQUID CRYSTAL DISPLAY PANEL

(71) Applicant: Sharp Kabushiki Kaisha, Sakai, Osaka (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 58 days.

(21) Appl. No.: 16/299,193

(22) Filed: Mar. 12, 2019

(65) Prior Publication Data
US 2019/0285954 A1  Sep. 19, 2019

(30) Foreign Application Priority Data

Mar. 16, 2018  (JP) .................................. 2018-049509

(51) Int. Cl.
| | |
|---|---|
| *G02F 1/1362* | (2006.01) |
| *G06F 3/041* | (2006.01) |
| *G02F 1/1333* | (2006.01) |
| *G06F 3/044* | (2006.01) |

(52) U.S. Cl.
CPC .... *G02F 1/136286* (2013.01); *G02F 1/13338* (2013.01); *G06F 3/044* (2013.01); *G06F 3/0412* (2013.01); *G02F 2001/13629* (2013.01)

(58) Field of Classification Search
CPC .......... G02F 1/136286; G02F 1/13338; G02F 2001/13629; G02F 2201/56; G02F 1/13452; G02F 1/134309; G06F 3/044; G06F 3/0412; G06F 3/0448; G06F 3/04164; G06F 3/0443

See application file for complete search history.

(56) References Cited

U.S. PATENT DOCUMENTS

| | | | | |
|---|---|---|---|---|
| 9,377,913 | B2 * | 6/2016 | Kim | ........................ G06F 3/044 |
| 9,904,432 | B2 * | 2/2018 | Choi | ..................... G06F 3/0416 |
| 10,304,913 | B2 * | 5/2019 | Choi | ................... H01L 27/3276 |

(Continued)

FOREIGN PATENT DOCUMENTS

JP   2008-257191 A   10/2008

*Primary Examiner* — Amy Onyekaba
(74) *Attorney, Agent, or Firm* — Keating & Bennett, LLP

(57) ABSTRACT

An embodiment of the present invention provides a liquid crystal display panel which allows for the area of a wiring diverting region to be reduced. A liquid crystal display panel 1 includes: a substrate (100) having a displaying region (30) and a non-displaying region (10); a plurality of first wires provided in a first layer; a plurality of second wires which are provided in a second layer differing from the first layer; a plurality of touch panel lines (60) which are provided in a third layer differing from both the first and second layers; a plurality of touch panel electrodes (70) each of which is connected to a respective one of the plurality of touch panel lines (60); and a sensing section (80) which is provided at a first end of the substrate (100) and connected to the plurality of touch panel lines (60), out of those of the plurality of touch panel lines (60) connected to those of the plurality of touch panel electrodes (70) located farther away from the sensing section (80) than is the non-displaying region (10), at least one touch panel line (60) being provided so as to run from the sensing section (80) to a second end of the substrate (100) and, at the second end, turn back toward the plurality of touch panel electrodes (70).

7 Claims, 8 Drawing Sheets

(56) References Cited

U.S. PATENT DOCUMENTS

| | | | |
|---|---|---|---|
| 10,418,434 B2* | 9/2019 | Kim | H01L 27/3262 |
| 10,490,620 B1* | 11/2019 | Lai | G02F 1/1368 |
| 2008/0117497 A1* | 5/2008 | Shimodaira | G02F 1/136286 |
| | | | 359/296 |
| 2008/0225216 A1 | 9/2008 | Shimodaira | |
| 2009/0051636 A1* | 2/2009 | Natori | G09G 3/3648 |
| | | | 345/87 |
| 2009/0102758 A1* | 4/2009 | Anzai | G09G 3/3677 |
| | | | 345/76 |
| 2010/0026611 A1* | 2/2010 | Igeta | G02F 1/136286 |
| | | | 345/55 |
| 2010/0060842 A1* | 3/2010 | Igeta | G02F 1/13394 |
| | | | 349/153 |
| 2014/0225869 A1* | 8/2014 | Hsu | G06F 3/044 |
| | | | 345/175 |
| 2016/0019856 A1* | 1/2016 | Tanaka | G09G 3/3677 |
| | | | 345/206 |
| 2016/0247478 A1* | 8/2016 | Ishige | G09G 3/3677 |
| 2016/0291753 A1* | 10/2016 | Cao | G06F 3/0416 |
| 2017/0153749 A1* | 6/2017 | Noguchi | G06F 3/0412 |
| 2017/0154566 A1* | 6/2017 | Ryoo | G09G 3/3648 |
| 2017/0162111 A1* | 6/2017 | Kang | H01L 27/3276 |
| 2017/0162637 A1* | 6/2017 | Choi | H01L 27/3246 |
| 2017/0235398 A1* | 8/2017 | Choi | G06F 1/1688 |
| | | | 345/173 |
| 2017/0288003 A1* | 10/2017 | Kim | H01L 27/124 |
| 2017/0293380 A1* | 10/2017 | Chauveau | G06F 3/044 |
| 2017/0372661 A1* | 12/2017 | Gu | H01L 27/3276 |
| 2018/0129111 A1* | 5/2018 | Wu | G02F 1/13338 |
| 2018/0136773 A1* | 5/2018 | Chen | G06F 3/0412 |
| 2018/0239466 A1* | 8/2018 | Yan | G06F 3/0412 |
| 2019/0155434 A1* | 5/2019 | Katsuta | G06F 3/0412 |
| 2019/0332224 A1* | 10/2019 | Bok | G06F 3/0421 |
| 2020/0033972 A1* | 1/2020 | Huang | H01L 27/124 |

* cited by examiner

LIQUID CRYSTAL DISPLAY PANEL

This Nonprovisional application claims priority under 35 U.S.C. § 119 on Patent Application No. 2018-049509 filed in Japan on Mar. 16, 2018, the entire contents of which are hereby incorporated by reference.

TECHNICAL FIELD

The present invention relates to a liquid crystal display panel.

BACKGROUND ART

Conventionally, there are cases in which a liquid crystal display panel having a built-in touch sensing function has an opening formed in its substrate. In such cases, yield rates decrease due to issues such as disconnections and short circuits. Conversely, securing a high yield rate involves decreasing the size of a displaying region of the substrate.

This reason for this is as follows. Wiring cannot be provided in the opening because the substrate does not exist in the opening. It is therefore necessary to provide, peripherally to the opening, a wiring diverting region for diverting wiring such as gate lines, data lines, and touch panel lines (TP lines). A sealing material for sealing the liquid crystals must also be provided in the wiring diverting region, and thus the wiring diverting region must have a certain width. However, it is preferable to keep the width of the wiring diverting region small so as to avoid a decrease in the size of the displaying region. As such, the various wires are provided densely in the wiring diverting region. This requires decreasing the width of the wires themselves and/or the spacing between the wires. Such a configuration is therefore prone to disconnections and short circuits.

Patent Literature 1, for example, discloses a display device which makes it possible to provide an adequate display area by (i) gathering, in the periphery of a through hole, low-voltage power supply lines and high-voltage power supply lines connected to a pixel driving circuit, so as to reduce the space for providing these power supply lines and (ii) in a region where scanning lines cross with these power supply lines in a planar view, provide the scanning lines in a separate layer above an insulating layer.

CITATION LIST

Patent Literature

[Patent Literature 1]
Japanese Patent Application Publication, Tokukai, No. 2008-257191 (Publication Date: Oct. 23, 2008)

SUMMARY OF INVENTION

Technical Problem

Unfortunately, in a configuration having touch panel lines, using the techniques disclosed in Patent Literature 1 as-is so that certain wires are merely provided in separate layers would be not be sufficient to reduce the area of a wiring diverting region while also avoiding a decreased yield rate.

The present invention has been made in view of the above problem. An object of the present invention is to provide a liquid crystal display panel which allows for the area of a wiring diverting region to be reduced in a configuration including touch panel lines.

Solution to Problem

In order to solve the above problem, a liquid crystal display panel in accordance with an aspect of the present invention includes: a substrate having a displaying region and a non-displaying region; a plurality of first wires provided in a first layer; a plurality of second wires which are provided in a second layer differing from the first layer in a manner so as to run crosswise with respect to the plurality of first wires; a plurality of touch panel lines which are provided in a third layer differing from both the first and second layers; a plurality of touch panel electrodes each of which is connected to a respective one of the plurality of touch panel lines; and a sensing section which is provided at a first end of the substrate and connected to the plurality of touch panel lines, out of those of the plurality of touch panel lines connected to those of the plurality of touch panel electrodes located farther away from the sensing section than is the non-displaying region, at least one touch panel line being provided so as to run from the sensing section to a second end of the substrate and, at the second end, turn back toward the plurality of touch panel electrodes.

Advantageous Effects of Invention

An aspect of the present invention makes it possible to provide a liquid crystal display panel which allows for the area of a wiring diverting region to be reduced in a configuration including touch panel lines.

Figure 1:
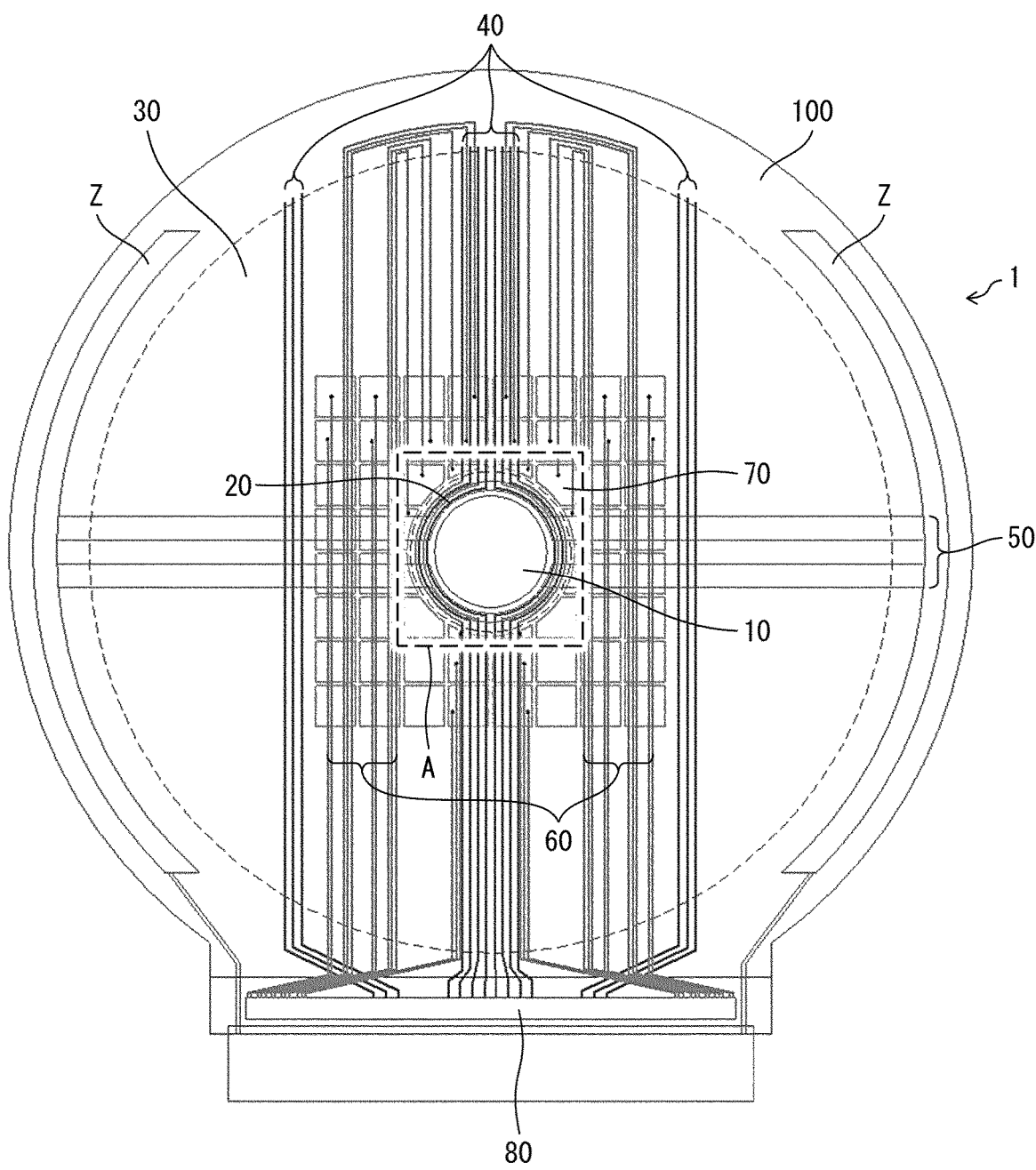
FIG. 1 is a diagram illustrating an overall configuration of a liquid crystal display panel in accordance with Embodiment 1 of the present invention.
Figure 2:
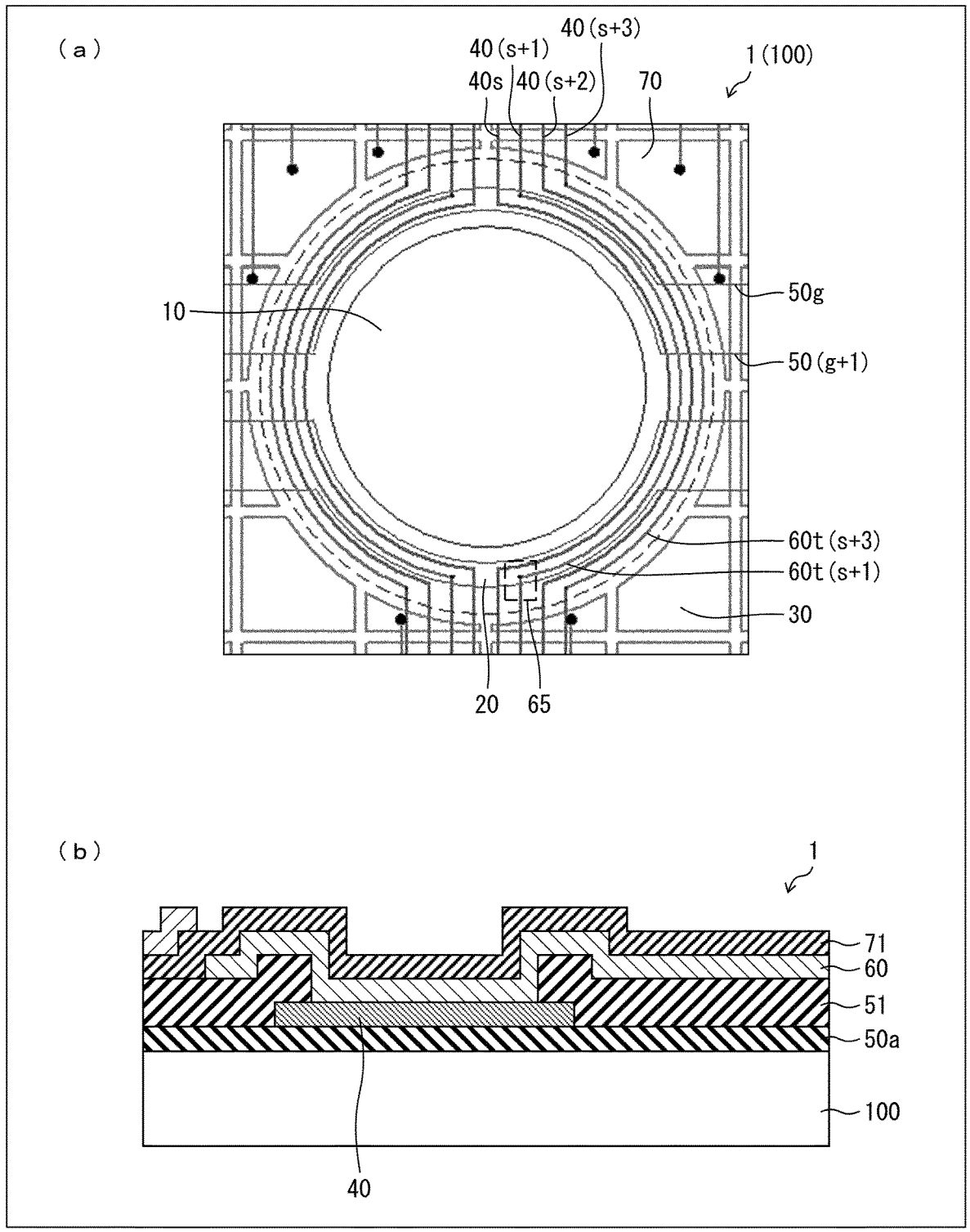

(a) of FIG. 2 is an enlarged view of section A of FIG. 1. (b) of FIG. 2 is a cross-sectional view of a connection section shown in (a) of FIG. 2.

Figure 3:
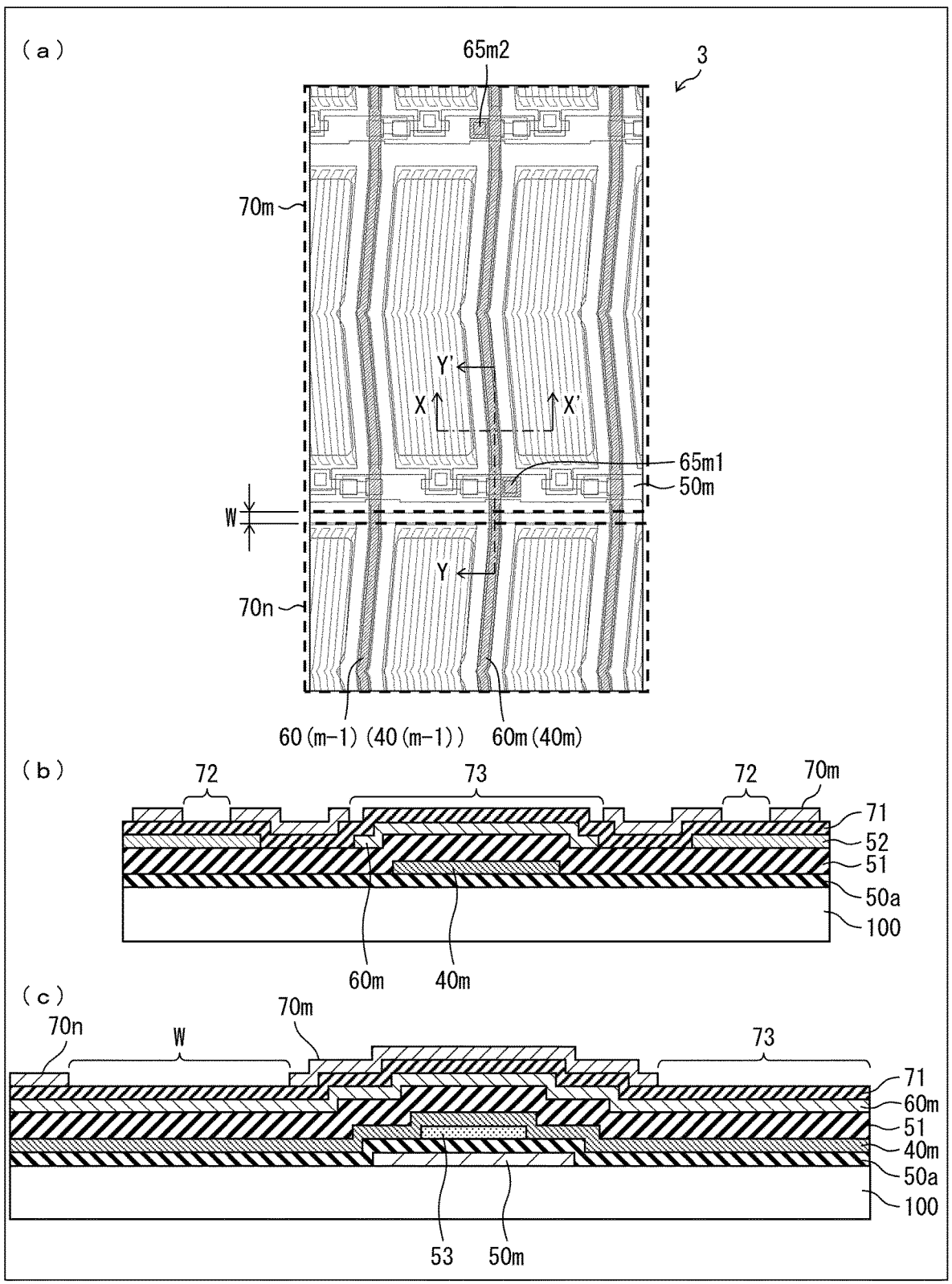

(a) of FIG. 3 is a plan view of one unit pixel included in the liquid crystal display panel of FIG. 1. (b) of FIG. 3 is a cross-sectional view taken along line X-X' of (a) of FIG. 3. (c) of FIG. 3 is a cross-sectional view taken along line Y-Y' of (a) of FIG. 3.

Figure 4:
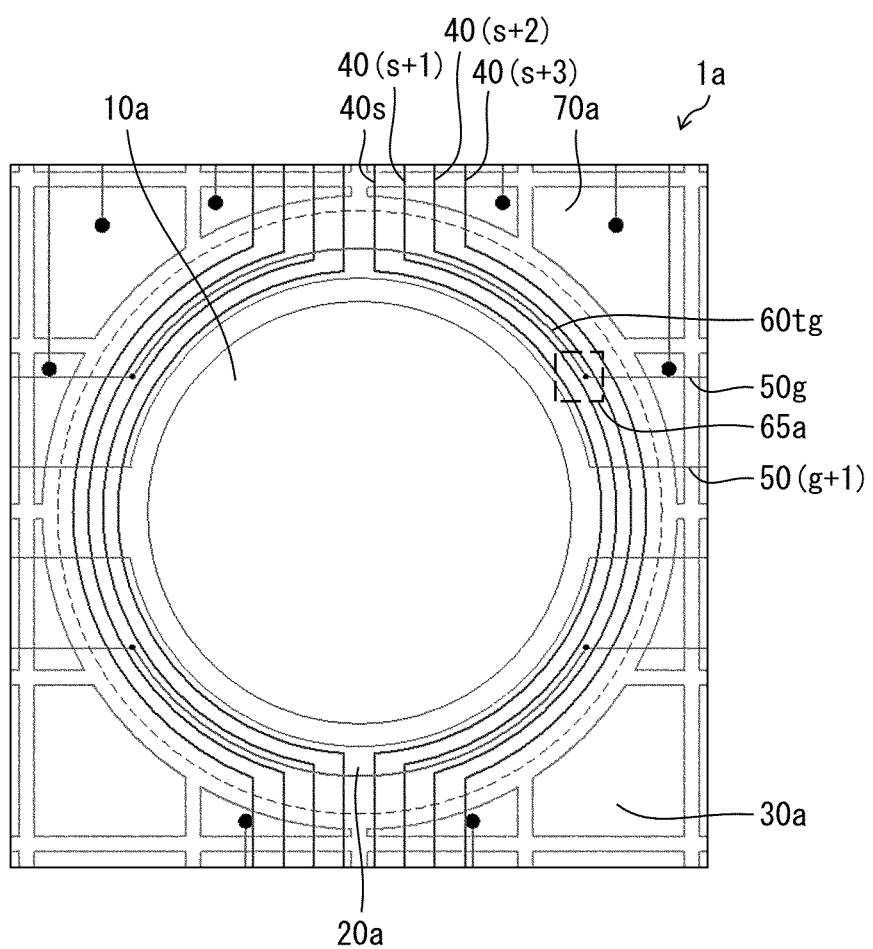

FIG. 4 illustrates Variation 1 of the liquid crystal display panel in accordance with Embodiment 1. FIG. 4 shows a view corresponding to (a) of FIG. 2.

Figure 5:
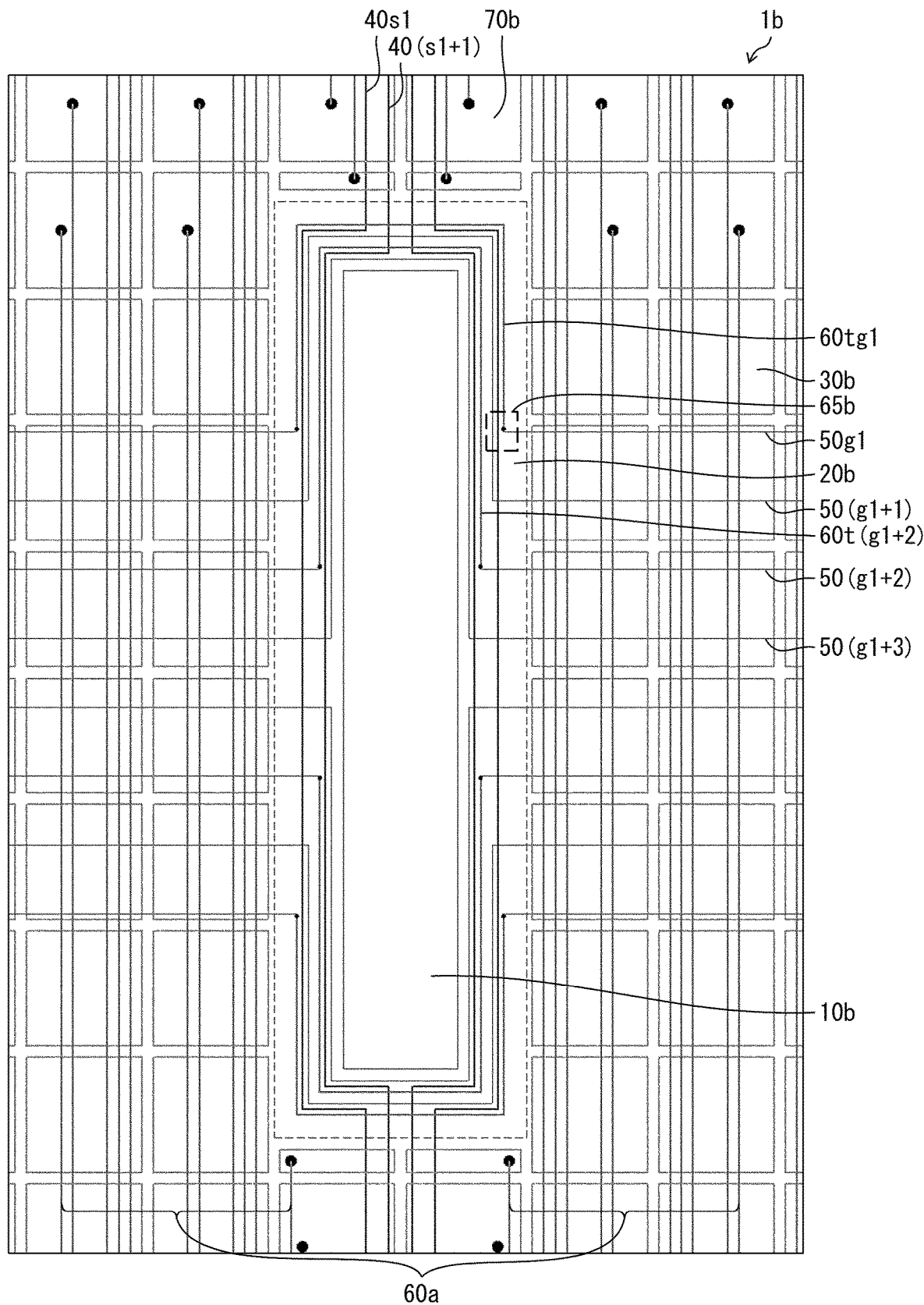

FIG. 5 illustrates Variation 2 of the liquid crystal display panel in accordance with Embodiment 1. FIG. 5 shows a view corresponding to (a) of FIG. 2.

Figure 6:
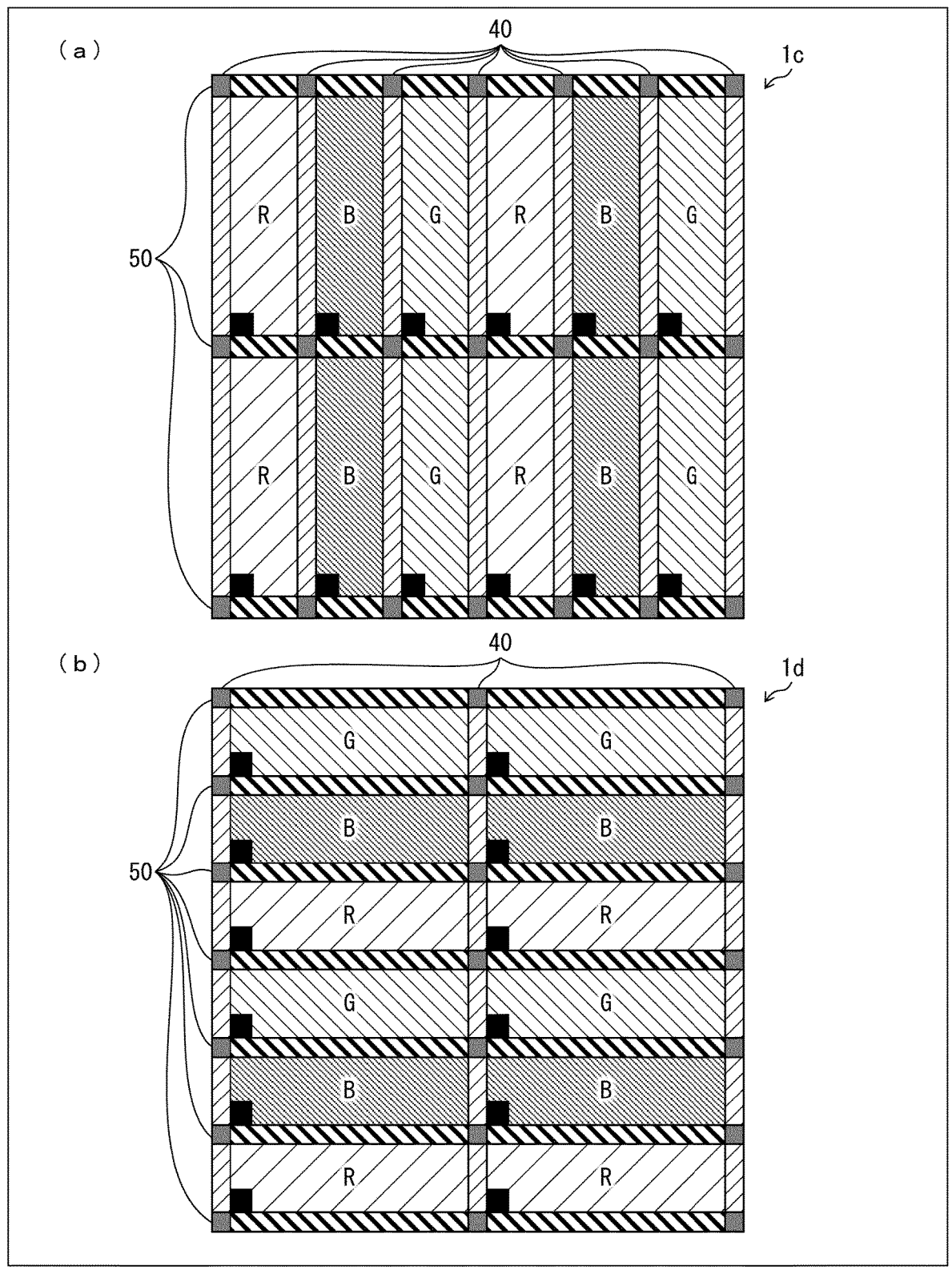

FIG. 6 is a diagram for explaining a pixel layout. (a) of FIG. 6 illustrates a vertical pixel layout, whereas (b) of FIG. 6 illustrates a horizontal pixel layout.

Figure 7:
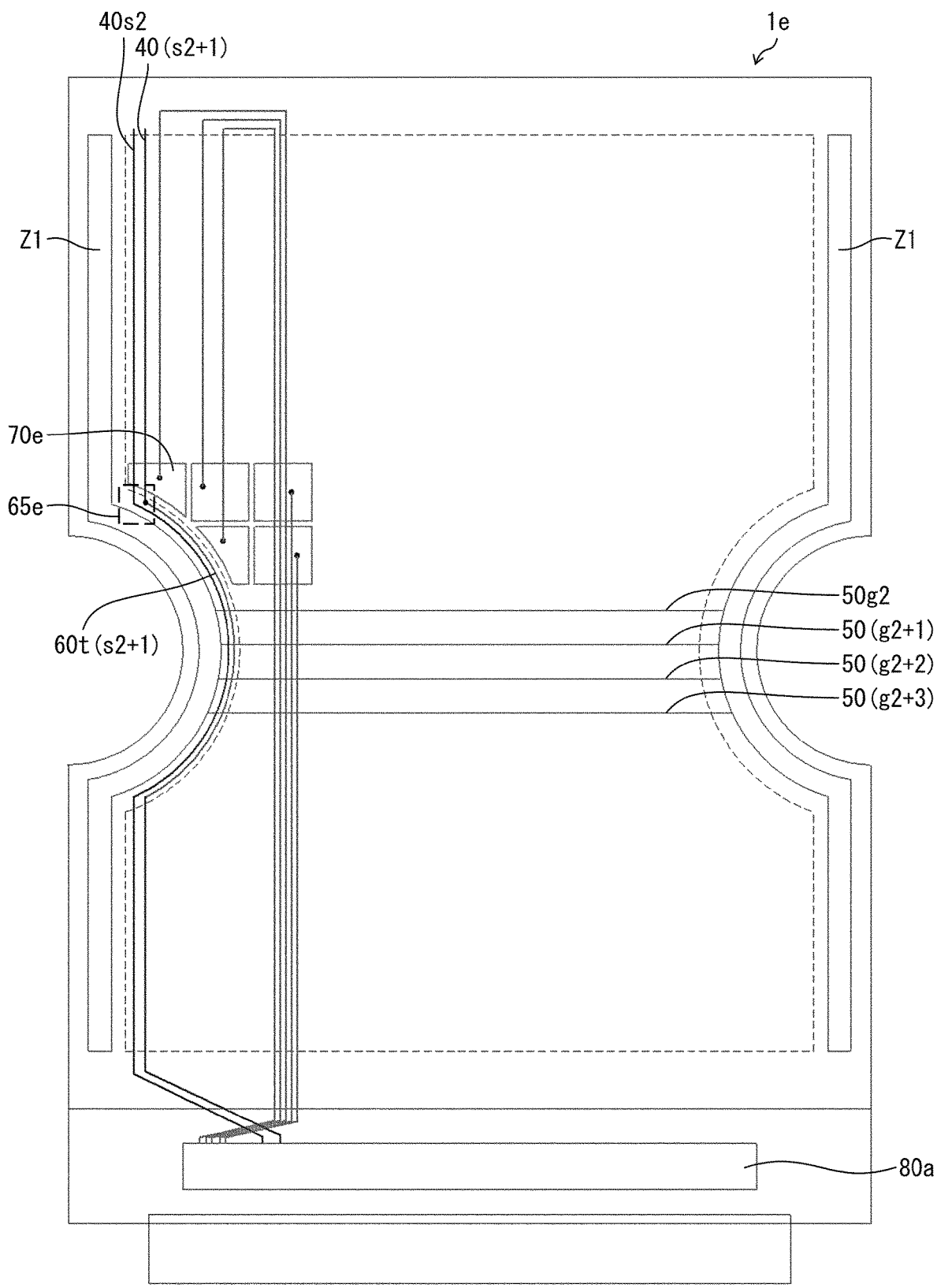

FIG. 7 is a diagram illustrating an overall configuration of a liquid crystal display panel in accordance with Embodiment 2 of the present invention.

Figure 8:
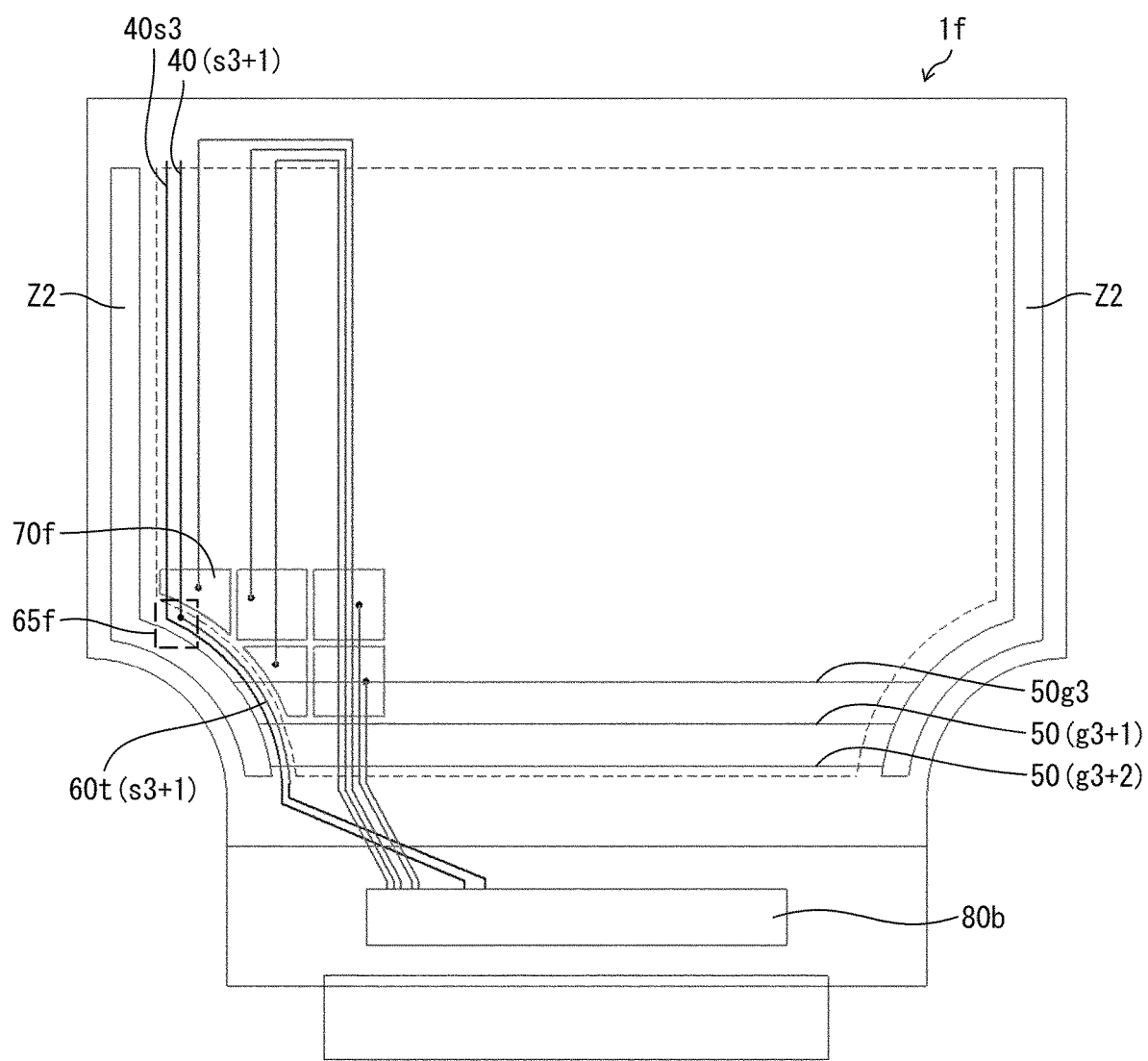

FIG. 8 is a diagram illustrating an overall configuration of a liquid crystal display panel in accordance with Embodiment 3 of the present invention.

DESCRIPTION OF EMBODIMENTS

Embodiment 1

The following description will discuss Embodiment 1 of the present invention, with reference to FIGS. 1 to 6.

(Overall Configuration of Liquid Crystal Display Panel)

The following description will discuss, with reference to FIG. 1, an overall configuration of a liquid crystal display panel in accordance with Embodiment 1. FIG. 1 is a diagram illustrating an overall configuration of a liquid crystal display panel 1 in accordance with Embodiment 1. As illustrated in FIG. 1, the liquid crystal display panel 1 includes a substrate (array substrate) 100 such as a glass substrate, an opposing substrate provided so as to oppose the substrate 100 with a predetermined distance therebetween, and a liquid crystal layer sealed between the substrate 100 and the opposing substrate. The liquid crystal display panel 1 has a displaying region 30 and a non-displaying region 10. FIG. 1 illustrates an example configuration in which (i) the liquid crystal display panel 1 is substantially circular in contour (only a sensing section being rectilinear in contour) and (ii) the non-displaying region 10 is also circular and is in a substantially central portion of the liquid crystal display panel 1. The displaying region 30 surrounds the non-displaying region 10. The substrate 100 has a substantially circular cutout section which overlaps with all of, or at least part of, the non-displaying region 10. The reference sign 80 in FIG. 1 indicates a sensing section provided at, for example, a first end of the substrate 100 (for example, a lower end as illustrated in FIG. 1). The sensing section 80 detects a touch position at which a user has touched the liquid crystal panel, based on a change in electric potential in a plurality of touch panel electrodes (described later). Note that the sensing section 80 may be included in a source driving section which provides a data signal to source lines 40 (described later).

The reference sign 20 indicates a wiring diverting region located peripherally to the non-displaying region 10. The reference sign 40 indicates data lines (also called "source lines"). The reference sign 50 indicates gate lines (also called scanning lines). The reference sign Z indicates a gate driving section which provides a scan signal to the gate lines 50.

The reference sign 60 indicates touch panel lines, and the reference sign 70 indicates touch panel electrodes (also called common electrodes) connected to respective ones of the touch panel lines 60. The gate lines 50 are provided in a layer differing from a layer in which the data lines 40 are provided. The gate lines 50 run crosswise with respect to the data lines 40. The touch panel lines 60 are provided in a layer differing from both (i) the layer in which the data lines 40 are provided and (ii) the layer in which the gate lines 50 are provided.

Note that although the presently discussed example involves a configuration in which the substrate 100 includes a cutout section in the non-displaying region 10, it is not essential for the substrate 100 to have such a cutout section. For example, even in a configuration where the substrate 100 is present in the non-displaying region 10, the transmittance of the non-displaying region 10 can be improved by providing the wiring diverting region peripherally to the non-displaying region 10, such that no wiring is present in the non-displaying region 10. Such a configuration is suitable for a game machine in which, for example, a backlight is not provided behind the non-displaying region 10, and instead, a drum (reel) for a slot machine is provided.

The embodiments of the present invention as discussed herein assume, as a basic configuration, a so-called "full in-cell touch panel" configuration, in which touch panel electrodes and other such basic components of touch sensors are integrated on the substrate.

A common electrode is also provided on the substrate, the common electrode being a shared electrode paired with pixel electrodes of each pixel included in the liquid crystal display panel. The liquid crystal layer is provided between the pixel electrodes and the common electrode. The common electrode is divided into a plurality of rectangular electrodes (which, in the vicinity of the non-displaying region, may also have a non-rectangular shape) whose sides are, for example, approximately 2 mm to 6 mm in length. Each of these rectangular electrodes is connected to at least one respective touch panel line so as to function as a touch panel electrode (also called "TP electrode").

A period in which the plurality of touch panel electrodes function as touch sensors (a sensing period) differs from a period in which an image signal is written in each pixel (writing period). In the writing period, the plurality of touch panel electrodes are caused to have the same constant potential.

The present configuration assumes that oxide semiconductor thin film transistors are used as switching elements for each pixel. This is because the present configuration assumes the use of an in-cell touch panel, which has a high sensor precision (high ratio of sensing period time to writing period time), and an oxide semiconductor thin film transistor is suitable as a switching element for a case where the charge time of each pixel is short. However, in accordance with such factors as screen size, resolution, and sensor precision, it is possible to use an a-Si thin film transistor, a p-Si thin film transistor, or the like.

As illustrated in FIG. 1, the liquid crystal display panel 1 includes a plurality of data lines 40, a plurality of gate lines 50, and a plurality of touch panel lines 60. In Embodiment 1, the touch panel electrodes 70 are provided so as to be in 1-to-1 correspondence with the touch panel lines 60.

One of the plurality of touch panel lines 60 which is connected to one of the touch panel electrodes located farther away from the sensing section 80 than is the non-displaying region 10 (for example, one of the touch panel electrodes 70 which is adjacent to the non-displaying region 10 in FIG. 1), is provided so as to run from the sensing section 80 to a second end of the substrate 100 (for example, an upper end as illustrated in FIG. 1) and, at the second end, turn back towards the touch panel electrodes 70.

In Embodiment 1, each of the touch panel electrodes 70 is larger in size than each of the pixels. As such, the number of touch panel lines 60 required for the sensing section 80 to carry out sensing is, generally, less than the number of data lines 40. As will be described later, in Embodiment 1, the touch panel lines 60 are provided so as to be parallel to respective ones of the data lines 40 (in a layer above the data lines 40).

As such, in a configuration similar to conventional art, in which the touch panel lines 60 are not routed so as to first run in one direction and the turn back, there are data lines 40 along which no corresponding touch panel line is present (i.e., data lines for which no touch panel line 60 is present in layer thereabove). In the present specification, for convenience, such a data line is referred to as a "surplus data line".

In Embodiment 1, providing touch panel lines 60 so as to be parallel to respective ones of the surplus data lines (specifically, in a layer above the surplus data lines), after first running in one direction and then turning back as described above, makes it possible to suitably route the touch panel lines through wiring regions which would not be utilized in conventional art.

(a) of FIG. 2 is an enlarged view of section A of FIG. 1. (b) of FIG. 2 is a cross-sectional view of a connection section 65 shown in (a) of FIG. 2. The term "connection section 65" (described later in detail) refers to a section at which one of the data lines 40 is connected to a touch panel line layer 60. As illustrated in (b) of FIG. 2, the liquid crystal display panel 1 includes a plurality of layers stacked upon each other. In (b) of FIG. 2, a gate line layer is not shown, but it can be seen that the liquid crystal display panel 1 includes the substrate 100, a gate insulating film 50a, a data line layer 40, a first insulating film 51, the touch panel line layer 60, and a second insulating film 71, in this order.

Note that in the present specification, the term "data line layer" can be used in a broad sense to refer to a layer in which data lines are provided, and in a narrower sense to refer to a data line itself which is provided in such a layer. The same applies to the other "line layers".

Thus, as described above, a liquid crystal display panel 1 of Embodiment 1 includes the substrate 100 having the displaying region 30 and the non-displaying region 10; a plurality of first wires (in Embodiment 1, this refers to the data lines 40) provided in a first layer; a plurality of second wires (in Embodiment 1, this refers to the gate lines 50) which are provided in a second layer differing from the first layer in a manner so as to run crosswise with respect to the plurality of first wires 40; the plurality of touch panel lines 60 which are provided in a third layer differing from both the first and second layers; a plurality of touch panel electrodes 70 each of which is connected to a respective one of the plurality of touch panel lines 60; and a sensing section 80 which is provided at a first end of the substrate 100 and connected to the plurality of touch panel lines 60, out of those of the plurality of touch panel lines 60 connected to those of the plurality of touch panel electrodes 70 located farther away from the sensing section 80 than is the non-displaying region 10, at least one touch panel line 60 being provided so as to run from the sensing section 80 to a second end of the substrate 100 and, at the second end, turn back toward the plurality of touch panel electrodes 70.

In a configuration having touch panel lines 60, the above configuration obviates the need to provide the touch panel lines 60 in the wiring diverting region 20 and therefore makes it possible to provide a liquid crystal display panel 1 in which the area of the wiring diverting region 20 is reduced.

With reference to FIG. 2, the following description will discuss in detail a configuration of the liquid crystal display panel 1. As described above, (a) of FIG. 2 is an enlarged view of section A of FIG. 1, and (b) of FIG. 2 is a cross-sectional view of the connection section 65 shown in (a) of FIG. 2. In the example illustrated in FIG. 2, data lines 40$s$, 40($s$+1), 40($s$+2), 40($s$+3), etc. constitute the plurality of first wires 40. Similarly, gate lines 50$g$, 50($g$+1), etc. constitute the plurality of second wires 50. Each of the plurality of touch panel electrodes 70 (in the example of (a) of FIG. 2, the 12 electrodes having various shapes) is connected to a respective one of the touch panel lines.

Note here that the letter "s" as used in the reference signs for the data lines 40$s$, 40($s$+1), 40($s$+2), 40($s$+3), etc. represents "source" and serves as an index for differentiating between differing data lines. The index "s" is an integer of not less than 0. The letter "g" as used in the reference signs for the gate lines 50$g$, 50($g$+1), etc. represents "gate" and serves as an index for differentiating between differing gate lines. The index "g" is an integer of not less than 0. Hereafter, "n," "m," etc. may be used as similar indices.

As illustrated in (a) of FIG. 2, the liquid crystal display panel 1 in accordance with Embodiment 1 is configured such that, in the wiring diverting region 20 located peripherally to the non-displaying region 10, at least one of the first wires 40 achieves an electrical connection via a connecting line (for example, connecting line 60$t$($s$+1) or connecting line 60$t$($s$+3)) which is provided in the same layer as the touch panel lines 60.

Note here that the "60$t$" in the reference sign of the connecting line 60$t$($s$+1) and connecting line 60$t$($s$+3) indicates that the lines are provided in the same layer as the touch panel lines 60. The "($s$+1)" and "($s$+3)" in these reference signs indicate that these lines correspond to the data lines 40($s$+1) and 40($s$+3), respectively. Similar expressions may be used in reference signs hereinafter.

With the above configuration, in the wiring diverting region 20, a portion of the data lines 40 achieve an electrical connection via a connecting line which is provided in the same layer as the touch panel lines 60. This makes it possible to use the touch panel line layer 60 effectively. This also makes it possible to reduce the likelihood of a short circuit between adjacent data lines. Furthermore, this configuration makes it possible to decrease the area of the wiring diverting region 20 without an excessive increase in the density at which the data lines 40 are provided.

As illustrated in FIGS. 1 and 2, the liquid crystal display panel 1 in accordance with Embodiment 1 is configured such that those of the touch panel lines 60 connected to those of the touch panel electrodes located closer to the sensing section 80 than is the non-displaying region 10 are provided so as to run from the sensing section 80 to a respective one of the touch panel electrodes without extending past and then turning back toward the respective one of the touch panel electrodes.

Specifically, as seen in the example illustrated in FIG. 1, six touch panel lines are connected to respective ones of six touch panel electrodes located closer to the sensing section 80 than is the non-displaying region 10. These six touch panel lines run from the sensing section 80 to the six touch panel electrodes without extending past and turning back toward the six touch panel electrodes.

With the above configuration, those of the touch panel lines which are connected to those of the touch panel electrodes located closer to the sensing section than is the non-displaying region are not routed through the wiring diverting region. This makes it possible to achieve connection in a simple manner, without having to increase the length of these touch panel lines. It is therefore possible to decrease the likelihood that a disconnection will occur.

With reference to FIG. 3, the following description will further discuss a configuration of the liquid crystal display panel 1. (a) of FIG. 3 is a plan view of one unit pixel 3 included in the liquid crystal display panel 1 of FIG. 1. (b) of FIG. 3 is a cross-sectional view taken along line X-X' of (a) of FIG. 3. (c) of FIG. 3 is a cross-sectional view taken along line Y-Y' of (a) of FIG. 3.

As illustrated in (a) of FIG. 3, the unit pixel 3 includes a touch panel electrode 70$m$ and a touch panel electrode 70$n$, which are separated by a distance W. The unit pixel 3 includes a connection section 65$m$1 and a connection section 65$m$2, which are for connecting the touch panel electrode 70$m$ and a touch panel line 60$m$. The touch panel line 60$m$ overlaps with a data line 40$m$ provided in a layer below the touch panel line 60$m$. Similarly, a touch panel line 60($m$−1) overlaps with a data line 40($m$−1) provided in a layer below the touch panel line 60($m$−1). The first insulating film 51 is provided between the touch panel lines and the data lines.

Note that touch panel line 60(m−1) is not connected to any touch panel electrodes in a column which includes the touch panel electrode 70m. The reference sign 50m indicates a gate line.

As illustrated in (b) of FIG. 3, the liquid crystal display panel includes the gate insulating film 50a which is provided on the substrate 100 so as to cover the substrate 100. A data line layer 40m is provided on the gate insulating film 50a. The first insulating film 51 is provided on the data line layer 40m so as to cover the data line layer 40m. A touch panel line layer 60m is provided on the first insulating film 51, in a position corresponding to the data line layer 40m. A pixel electrode layer 52, constituted by a transparent conductive film, is provided in the same layer as the touch panel line layer 60m, but in a location away from the touch panel line layer 60m. The second insulating film 71 is provided above the aforementioned layers so as to cover these layers. Finally, a touch panel electrode 70m, constituted by a transparent conductive film, is formed on the second insulating film 71. The touch panel electrode 70m has (i) an opening 73 which exposes a location corresponding to the touch panel line layer 60m and (ii) slits 72 which expose locations corresponding to the pixel electrode layer 52.

In this way, particularly as illustrated in (b) of FIG. 3, the liquid crystal display panel in accordance with Embodiment 1 is configured so that in a layer which differs from (i) the layer in which the first wires 40 are provided (in Embodiment 1, the data line layer 40m) and (ii) the layer in which the second wires 50 are provided (in Embodiment 1, a gate line layer 50m), the touch panel line 60m is provided in a manner so as to be parallel to a respective one of the first wires 40.

Furthermore, the liquid crystal display panel in accordance with Embodiment 1 is configured such that the touch panel line 60m is provided above the data line layer 40m, which constitutes a portion of the plurality of first wires 40, the first insulating film 51 being provided between the touch panel line 60m and the data line layer 40m. The wording "above a portion of the first wires 40" means that the touch panel line 60m is provided further away from the substrate than is the first wire 40m.

Examples of possible materials for the gate insulating film 50a include inorganic insulating materials such as silicon dioxide ($SiO_2$) and silicon nitride ($SiN_x$). In the present example, the gate insulating film 50a is assumed to be a laminated film in which silicon dioxide ($SiO_2$) is provided above silicon nitride ($SiN_x$). Examples of possible materials for the first insulating film 51 include organic insulating materials such as acrylic resin containing a photosensitizer. Alternatively, inorganic insulating materials such as silicon dioxide ($SiO_2$) and silicon nitride ($SiN_x$) can be used, similarly to the gate insulating film 50a. In the present example, the first insulating film 51 is assumed to be a laminated film in which silicon nitride ($SiN_x$) is provided above silicon dioxide ($SiO_2$).

Examples of possible materials for the touch panel line layer 60m include titanium (Ti), copper (Cu), aluminum (Al), ITO (transparent conductive film), and a laminated film including any of these. Examples of possible materials for the second insulating film 71 include inorganic insulating materials such as silicon nitride ($SiN_x$)

The data line layer 40m is a conductive layer. Examples of possible materials for the data line layer 40m include metallic materials such as titanium (Ti), copper (Cu), chromium (Cr), aluminum (Al), gold (Au), molybdenum (Mo), tungsten (W), an alloy of any of these, and a laminated film including any of these. In Embodiment 1, the data line layer 40m is preferably configured to have a two-layered structure including layer of copper (Cu) and a layer of titanium (Ti).

(c) of FIG. 3 illustrates a gate line layer 50m which can be made of the same material as the data line layer 40m. (c) of FIG. 3 also illustrates an oxide semiconductor film 53 provided on the gate insulating film 50a. Other members are as described above, and thus descriptions thereof are omitted here.

Note that on both the substrate 100 and the opposing substrate, an alignment film is provided as innermost layer which comes into contact with the liquid crystal layer. The alignment films orient the liquid crystal molecules in the liquid crystal layer.

The touch panel electrodes 70 function as a common electrode paired with pixel electrodes 52. When a potential difference occurs between a pixel electrode 52 and a touch panel electrode 70 overlapping with each other, a fringe field is generated between that pixel electrode 52 and the fringes of the slit 72, the fringe field including a component parallel to the surface of the substrate 100. Using the fringe field makes it possible to control the orientation of liquid crystal molecules in the liquid crystal layer. In other words, the liquid crystal display panel 1 in accordance with embodiment employs a fringe field switching (FFS) mode.

(Variation 1)

A configuration of Variation 1 differs from that of Embodiment 1 mainly in that, in the wiring diverting region, it is the gate lines 50 that achieve an electrical connection via the connecting lines. The following description will focus mainly on this difference.

The following description will discuss, with reference to FIG. 4, a configuration of a liquid crystal display panel 1a. In Variation 1, any members similar to those of Embodiment 1 will be given the same reference sign as in Embodiment 1, and descriptions thereof will be omitted unless necessary. FIG. 4 illustrates Variation 1 of the liquid crystal display panel in accordance with Embodiment 1. FIG. 4 shows a view corresponding to (a) of FIG. 2.

As illustrated in FIG. 4, data lines 40s, 40(s+1), 40(s+2), 40(s+3), etc. constitute the plurality of first wires 40. Similarly, gate lines 50g, 50(g+1), etc. constitute the plurality of second wires 50. Each of a plurality of touch panel electrodes 70a (in the example of FIG. 4, the 12 electrodes having various shapes) is connected to a respective one of the touch panel lines.

As illustrated in FIG. 4, the liquid crystal display panel 1a in accordance with Variation 1 is configured such that, in a wiring diverting region 20a located peripherally to a non-displaying region 10a, at least one of the second wires 50 achieves an electrical connection via a connecting line (for example, a connecting line 60tg) which is provided in the same layer as the touch panel lines.

Note here that the "60t" in the reference sign of the connecting line 60tg indicates that the line is provided in the same layer as the touch panel lines. The "g" in this reference sign indicates that the line corresponds to a gate line 50g.

The above configuration, too, makes it possible achieve an effect similar to that of Embodiment 1.

(Variation 2)

The configuration of Variation 2 differs from that of Variation 1 mainly in that the non-displaying region is not circular in shape, but rather, for example, rectangular. The following description will focus mainly on this difference.

The following description will discuss, with reference to FIG. 5, a configuration of a liquid crystal display panel 1b. In Variation 2, any members similar to those in Embodiment 1 will be given the same reference sign, and descriptions thereof will be omitted unless necessary. FIG. 5 illustrates Variation 2 of the liquid crystal display panel in accordance with Embodiment 1. FIG. 5 shows a view corresponding to (a) of FIG. 2.

As illustrated in FIG. 5, data lines 40$s$1, 40($s$1+1), etc. constitute the plurality of first wires 40. Similarly, gate lines 50$g$1, 50($g$1+1), 50($g$1+2), 50($g$1+3), etc. constitute the plurality of second wires 50. Each of a plurality of touch panel electrodes 70$b$ (in the example of FIG. 5, electrodes having various shapes) is connected to a respective one of touch panel lines.

As illustrated in FIG. 5, the liquid crystal display panel 1$b$ in accordance with Variation 2 is configured such that, in a wiring diverting region 20$b$ located peripherally to a non-displaying region 10$b$, at least one of the second wires 50 achieves an electrical connection via a connecting line (for example, connecting line 60$t$g1 or connecting line 60$t$(g1+2)) which is provided in the same layer as touch panel lines 60$a$.

Note here that the "60$t$" in the reference sign of the connecting line 60$t$g1 and connecting line 60$t$(g1+2) indicates that the lines are provided in the same layer as the touch panel lines. The "g1" and "g1+2" in these reference signs indicate that these lines correspond to a gate line 50$g$1 and a gate line 50($g$1+2), respectively.

The above configuration, too, makes it possible achieve an effect similar to that of Embodiment 1 and Variation 1.

The above descriptions involved configurations where either (i) one or more data lines 40 or (ii) one or more gate lines 50 achieved an electrical connection via a connecting line. Note, however, that these examples are non-limiting. For example, the connecting line may be used with respect to both the data lines and the gate lines.

(Pixel Layout)

The following description will discuss, with reference to FIG. 6, a pixel layout in a liquid crystal display panel. FIG. 6 is a diagram for explaining a pixel layout. (a) of FIG. 6 illustrates vertical pixels (which can also be called vertical stripe pixels or vertically oriented pixels), whereas (b) of FIG. 6 illustrates horizontal pixels (which can also be called horizontal stripe pixels or horizontally oriented pixels).

The pixel layout of a liquid crystal display panel 1$c$ as illustrated in (a) of FIG. 6 can be compared as follows to the pixel layout of a liquid crystal display panel 1$d$ as illustrated in (b) of FIG. 6. In a horizontal pixel layout, an opposing substrate (provided so as to oppose a substrate having a displaying region and a non-displaying region) has a color filter whose orientation is rotated 90 degrees as compared to that of a vertical pixel layout. Compared to a vertical pixel layout, the horizontal pixel layout has an increased number of gate lines 50 (for example, three times as many) but a proportionally decreased number of data lines 40 (for example, ⅓ as many). In an example configuration having the pixel layout illustrated in (b) of FIG. 6, even if there are more gate lines than data lines in a wiring diverting region, applying the configuration of Variation 2 makes it possible to achieve an effect similar to that of Embodiment 1 and Variation 1.

Embodiment 2

Discussed above were examples in which a circular or rectangular non-displaying region was provided in the center of a liquid crystal display panel. The present invention is not, however, limited to such examples. For example, the non-displaying region may be provided in a peripheral region of a liquid crystal display panel. In other words, it is not essential for the non-displaying region to be completely surrounded by the displaying region. It is possible to employ a configuration in which the perimeter of the non-displaying region is at least partly defined by the displaying region. Furthermore, the non-displaying region may have a shape other than those described above.

FIG. 7 is a diagram illustrating an overall configuration of a liquid crystal display panel 1$e$ in accordance with Embodiment 2. For example, even in a configuration where a non-displaying region is provided so as to be in contact with a side of a mostly rectangular contour (displaying region) (as is the case with the semicircular shapes on the left and right sides in FIG. 7), data lines 40$s$2, 40($s$2+1), etc. constitute a plurality of first wires 40, as illustrated in FIG. 7. Similarly, gate lines 50$g$2, 50($g$2+1), 50($g$2+2), 50($g$2+3), etc. constitute a plurality of second wires 50. Each of a plurality of touch panel electrodes 70$e$ (in the example of FIG. 7, electrodes having various shapes) is connected to a respective one of touch panel lines. Reference sign Z1 indicates a gate driving section which provides a scan signal to the gate lines.

As illustrated in FIG. 7, the liquid crystal display panel 1$e$ in accordance with Embodiment 2 is configured such that, in a wiring diverting region located peripherally to a non-displaying region, at least one of the first wires 40 achieves an electrical connection via a connecting line (for example, connecting line 60$t$(s2+1)) which is provided in the same layer as the touch panel lines.

Note here that the "60$t$" in the reference sign of the connecting line 60$t$(s2+1) indicates that the line is provided in the same layer as the touch panel lines 60. The "(s2+1)" in this reference sign indicates that the line corresponds to a data line 40($s$2+1).

The above configuration, too, makes it possible achieve an effect similar to that of Embodiment 1 and the variations of Embodiment 1.

Embodiment 3

The following description will discuss, with reference to FIG. 8, a configuration of a liquid crystal display panel in accordance with Embodiment 3. FIG. 8 is a diagram illustrating an overall configuration of a liquid crystal display panel 1$f$ in accordance with Embodiment 3. For example, even in a configuration where a non-displaying region is provided so as to be in one or more corners of a mostly rectangular contour (displaying region) (as is the case with the lower left and lower right portions in FIG. 8), data lines 40$s$3, 40($s$3+1), etc. constitute a plurality of first wires 40, as illustrated in FIG. 8. Similarly, gate lines 50$g$3, 50($g$3+1), 50($g$3+2), etc. constitute a plurality of second wires 50. Each of a plurality of touch panel electrodes 70$f$ (in the example of FIG. 8, electrodes having various shapes) is connected to a respective one of touch panel lines. Reference sign Z2 indicates a gate driving section which provides a scan signal to the gate lines.

As illustrated in FIG. 8, the liquid crystal display panel 1$f$ in accordance with Embodiment 3 is configured such that, in a wiring diverting region located peripherally to a non-displaying region, at least one of the first wires 40 achieves an electrical connection via a connecting line (for example, connecting line 60$t$(s3+1)) which is provided in the same layer as the touch panel lines.

Note here that the "60$t$" in the reference sign of the connecting line 60$t$(s3+1) indicates that the line is provided in the same layer as the touch panel lines 60. The "(s3+1)" in this reference sign indicates that the line corresponds to a data line 40(s3+1).

The above configuration, too, makes it possible achieve an effect similar to that of Embodiment 1, the variations of Embodiment 1, and Embodiment 2.

While the above descriptions discuss an example in which the first wires 40 are data lines and the second wires 50 are gate lines, this example is non-limiting. For example, the first wires 40 may be gate lines and the second wires 50 may be data lines.

In the above descriptions, the non-displaying region may be a region in which the substrate is not present, or may be a region in which the substrate is present but no pixels are provided.

[Recap]

A liquid crystal display panel 1 in accordance with Aspect 1 of the present invention includes: a substrate (100) having a displaying region (30) and a non-displaying region (10); a plurality of first wires (40) provided in a first layer; a plurality of second wires (50) which are provided in a second layer differing from the first layer in a manner so as to run crosswise with respect to the plurality of first wires (40); a plurality of touch panel lines (60) which are provided in a third layer differing from both the first and second layers; a plurality of touch panel electrodes (70) each of which is connected to a respective one of the plurality of touch panel lines (60); and a sensing section (80) which is provided at a first end of the substrate (100) and connected to the plurality of touch panel lines (60), out of those of the plurality of touch panel lines (60) connected to those of the plurality of touch panel electrodes (70) located farther away from the sensing section (80) than is the non-displaying region (10), at least one touch panel line (60) being provided so as to run from the sensing section (80) to a second end of the substrate (100) and, at the second end, turn back toward the plurality of touch panel electrodes (70).

The above configuration makes it possible to provide a liquid crystal display panel (1) which allows for the area of a wiring diverting region (20) to be reduced in a configuration including gate lines (50), data lines (40), and touch panel lines (60).

In Aspect 2 of the present invention, the liquid crystal display panel 1 of Aspect 1 may be configured such that in a wiring diverting region (20) located peripherally to the non-displaying region (10), at least one of the plurality of first wires (40) and at least one of the plurality of second wires (50) achieve an electrical connection via a respective connecting line provided in the third layer.

With the above configuration, in the wiring diverting region (20), a portion of the data lines (40) achieve an electrical connection via a connecting line which is provided in the layer in which the touch panel lines (60) are provided. This makes it possible to use the touch panel line layer (60) effectively. This configuration also makes it possible to reduce the likelihood of a short circuit between adjacent gate lines. Furthermore, this configuration makes it possible to decrease the area of the wiring diverting region (20) without an excessive increase in the density at which the data lines (40) are provided.

In Aspect 3 of the present invention, the liquid crystal display panel 1 of Aspect 1 or 2 may be configured such that those of the plurality of touch panel lines (60) connected to those of the plurality of touch panel electrodes (70) located closer to the sensing section (80) than is the non-displaying region (10) are provided so as to run from the sensing section (80) to a respective one of the plurality of touch panel electrodes (70) without extending past and then turning back toward the respective one of the touch panel electrodes (70).

With the above configuration, those of the touch panel lines which are connected to those of the touch panel electrodes located closer to the sensing section than is the non-displaying region are not routed through the wiring diverting region. This makes it possible to achieve connection in a simple manner, without having to increase the length of these touch panel lines. It is therefore possible to decrease the likelihood that a disconnection will occur.

In Aspect 4 of the present invention, the liquid crystal display panel 1 of any one of Aspects 1 to 3 may be configured such that in the third layer, the plurality of touch panel lines (60) are provided in a manner so as to be parallel to respective ones of the plurality of first wires (40).

In Aspect 5 of the present invention, the liquid crystal display panel 1 of any one of Aspects 1 to 4 may be configured such that the plurality of touch panel lines (60) are provided above a portion of the plurality of first wires (40), an insulating layer (51) being provided between the plurality of touch panel lines (60) and the plurality of first wires (40).

In Aspect 6 of the present invention, the liquid crystal display panel 1 of any one of Aspects 1 to 5 may be configured such that the plurality of first wires (40) are respective data lines, and the plurality of second wires (50) are respective gate lines.

In Aspect 7 of the present invention, the liquid crystal display panel 1 of Aspect 1 may be configured such that the plurality of first wires are respective gate lines (40), and the plurality of second wires (50) are respective data lines.

The present invention is not limited to the embodiments, but can be altered by a skilled person in the art within the scope of the claims. The present invention also encompasses, in its technical scope, any embodiment derived by combining technical means disclosed in differing embodiments. It is possible to form a new technical feature by combining the technical means disclosed in the respective embodiments.

REFERENCE SIGNS LIST 1, 1a to 1f Liquid crystal display panel
3 Unit pixel
10, 10a, 10b Non-displaying region
20, 20a, 20b Wiring diverting region
30, 30a, 30b Displaying region
40 (40s, 40(s+1) to 40(s3+1)), 40m First wire (data line)
50 (50g, 50(g+1) to 50(g3+2), 50m Second wire (gate line)
60, 60m Touch panel line
60t(s+1) to 60t(s3+1), 60tg to 60t(g1+2) Connecting line
65, 65a, 65b, 65e, 65f Connection section
70, 70a, 70b, 70e, 70f, 70m Touch panel electrode
80 Sensing section
100 Substrate

The invention claimed is:
1. A liquid crystal display panel comprising:
a substrate having a displaying region and a non-displaying region;
a plurality of first wires provided in a first layer;
a plurality of second wires which are provided in a second layer differing from the first layer in a manner so as to run crosswise with respect to the plurality of first wires;

a plurality of touch panel lines which are provided in a third layer differing from both the first and second layers;

a plurality of touch panel electrodes each of which is connected to a respective one of the plurality of touch panel lines; and a sensing section which is provided at a first end of the substrate and connected to the plurality of touch panel lines, out of those of the plurality of touch panel lines connected to those of the plurality of touch panel electrodes located farther away from the sensing section than is the non-displaying region, at least one touch panel line being provided so as to run from the sensing section to a second end of the substrate and, at the second end, turn back toward the plurality of touch panel electrodes.

2. The liquid crystal display panel as set forth in claim 1, wherein in a wiring diverting region located peripherally to the non-displaying region, at least one of the plurality of first wires and at least one of the plurality of second wires achieve an electrical connection via a respective connecting line provided in the third layer.

3. The liquid crystal display panel as set forth in claim 1, wherein those of the plurality of touch panel lines connected to those of the plurality of touch panel electrodes located closer to the sensing section than is the non-displaying region are provided so as to run from the sensing section to a respective one of the plurality of touch panel electrodes without extending to the second end of the substrate and then turning back toward the respective one of the touch panel electrodes.

4. The liquid crystal display panel as set forth in claim 1, wherein in the third layer, the plurality of touch panel lines are provided in a manner so as to be parallel to respective ones of the plurality of first wires.

5. The liquid crystal display panel as set forth in claim 1, wherein the plurality of touch panel lines are provided above a portion of the plurality of first wires, an insulating layer being provided between the plurality of touch panel lines and the plurality of first wires.

6. The liquid crystal display panel as set forth in claim 1, wherein the plurality of first wires are respective data lines, and the plurality of second wires are respective gate lines.

7. The liquid crystal display panel as set forth in claim 1, wherein the plurality of first wires are respective gate lines, and the plurality of second wires are respective data lines.

* * * * *